No. 807,635. PATENTED DEC. 19, 1905.
C. H. NEAL.
ADVERTISING DEVICE.
APPLICATION FILED OCT. 21, 1903.

2 SHEETS—SHEET 2.

Attest:
C. N. Fowler
M. H. Miles

Inventor:
Charles H. Neal,
By Howell Battle
Attorney

UNITED STATES PATENT OFFICE.

CHARLES H. NEAL, OF BALTIMORE, MARYLAND.

ADVERTISING DEVICE.

No. 807,635.  Specification of Letters Patent.  Patented Dec. 19, 1905.

Application filed October 21, 1903. Serial No. 177,895.

*To all whom it may concern:*

Be it known that I, CHARLES H. NEAL, a citizen of the United States, residing at Baltimore, in the State of Maryland, have invented new and useful Improvements in Advertising Devices, of which the following is a specification.

My invention relates to a device to be used for advertising purposes; and its prime object is to call attention to particular business concerns or articles of merchandise through the medium of an attractive picture which to all appearances shall be free from advertising matter, but which shall nevertheless have such matter associated therewith but concealed from view in a manner to excite the curiosity of the ordinary observer to discover and read the same, the idea being that an attractive picture which to all appearances has no advertising matter associated therewith will more readily find a place on the wall of an office or residence than one having an inscription in the nature of an advertisement printed thereon or associated therewith in a manner to be exposed to view, no matter how much merit the latter picture may possess as a work of art.

Meritorious reproductions of famous works of art and quite attractive photographs from nature have been frequently employed at large expense for advertising purposes; but in most instances advertising matter has either been printed thereon in a manner to render the picture objectionable as a wall adornment or so associated therewith as to be readily removed, and thus defeat the purpose of the advertiser.

My invention, broadly stated, consists, in combination with a picture or other attractive feature, of an inscription suggested thereby and associated therewith, a normally concealed advertising inscription in explanation or in continuation of the first-mentioned inscription, and means for exposing and for automatically concealing said advertising inscription.

After a detail description of my invention the features deemed novel will be specified in the claims hereunto annexed.

Figure 1:
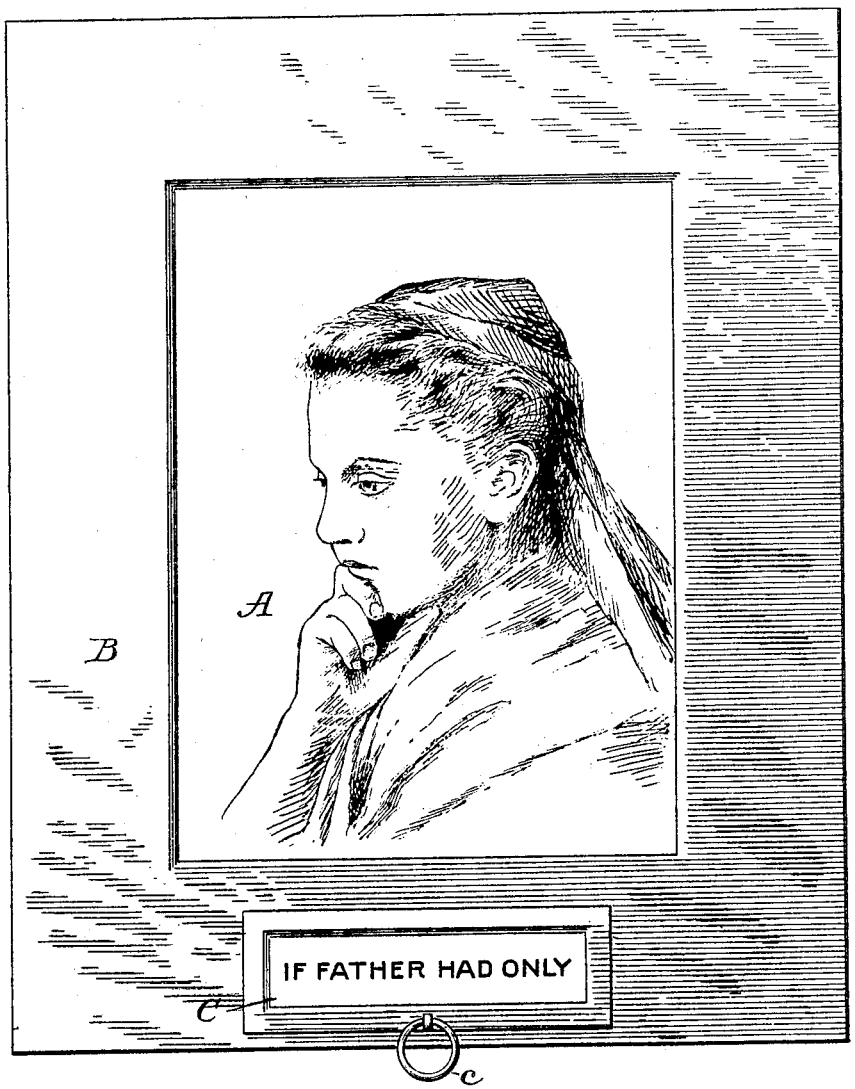
Figure 2:
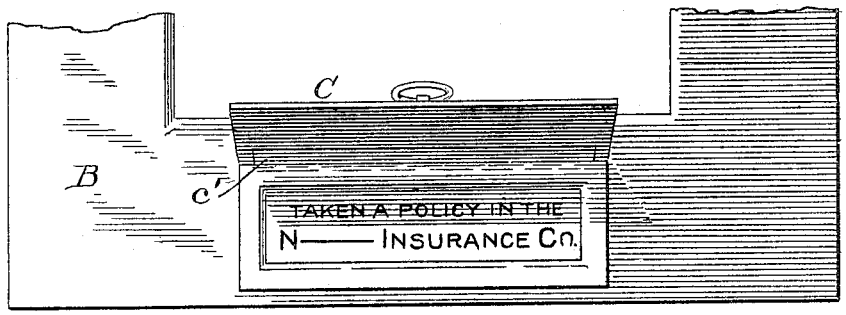
Figure 3:
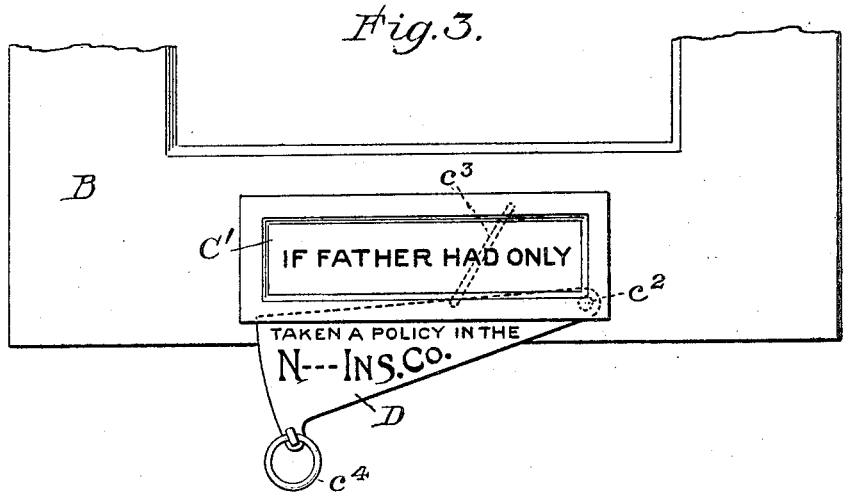

Referring to the drawings forming a part of this specification, Figure 1 represents a device embodying my invention. Fig. 2 is a view of the lower portion of the device of Fig. 1, the cover which normally conceals the advertising inscription being raised for exposing the latter; and Fig. 3 is a modified construction and arrangement of the supports for the associated inscriptions.

It is first to be understood that I do not limit my invention to an advertising medium in which the main feature of attraction is a picture, it being obvious that a bas-relief or other work of art may serve the intended purpose equally as well as a copy of a painting, an engraving, or a photograph.

In the drawings I show a picture A, which is intended to be a copy of a portrait of a young girl. The costume, the pose of the head and hand, and the expression of the face in the original picture plainly indicate poverty and distress, the subject being an attractive one from an artistic point of view. The picture is mounted in a frame or support B, and below the picture is an incomplete inscription suggested thereby and reading as follows: "If father had only." Said inscription is placed on a flap or cover C, which is hinged at its upper edge to the picture-support B, said flap serving as a cover for concealing an underlying advertising inscription. At its lower edge said cover is provided with a ring $c$, which serves as a handle for raising it, said ring also indicating to an observer the fact that the flap may be lifted and that a completion of the exposed inscription may probably be found thereunder. The flap C, with the inscription thereon, is arranged to give the appearance of being merely a title affixed to the picture; but the incomplete inscription, together with the handle or ring $c$, is sufficient to excite the curiosity of an ordinary observer and cause him to raise the flap or cover and read the advertising inscription concealed thereby. In Fig. 2 the flap or cover C is shown as being raised for disclosing the advertising inscription, which in this instance reads as follows: "Taken a policy in the N .... Insurance Co.," this latter inscription being in continuation of the normally exposed inscription and being designed to advertise the business of a life-insurance company.

As before stated, the flap or cover C is hinged at its upper edge, as at $c'$, to the picture frame or support B, so that after said cover has been raised it will drop of its own weight to its original or normal position and again conceal the advertising inscription. This is an important feature of the device, in that it insures a proper concealment of the advertisement at all times, except when the curiosity of an observer has been excited to discover and read the same.

Any picture, bas-relief, or other work of art may be utilized as the attractive feature of the device, and the inscriptions may be such as will best suit the fancy of the advertiser or the particular business concern or article of merchandise to be advertised.

In Fig. 3 I show a modified arrangement of the inscription-bearing portions of the device, the exposed inscriptions being on a fixed base or support $C'$, the latter being so mounted on the picture-support B as to leave an intervening space for a movable slide D, upon which is printed the advertising inscription. Said slide is pivotally mounted, as at $c^2$, directly behind the inscription-support $C'$ and is normally held behind said support by an elastic cord or band $c^3$, which is clearly indicated in dotted lines. Said slide is provided with a handle or ring $c^4$, by means of which it is pulled down for exposing the advertisement, the elastic cord $c^3$ operating to automatically return it to its concealed position, as will be readily understood.

Having thus described my invention, what I claim as new, and desire to secure by Letters Patent, is—

1. An advertising medium embodying in combination with a picture or other attractive feature, an inscription suggested thereby and associated therewith, a normally concealed advertising inscription in explanation or in continuation of the first-mentioned inscription, and means for exposing and for automatically concealing said advertising inscription, said means and inscriptions being outside of the boundary or limits of the picture or other attractive feature, for the purpose specified.

2. An advertising medium embodying a support for an attractive feature, such as a fine picture, and affording a foundation or support for an advertising inscription, a cover for said inscription adapted to receive an inscription to excite curiosity and adapted also to be moved by hand for disclosing the advertising inscription and when released to automatically close and again cover said advertising inscription, the latter together with said cover being located outside of the field occupied by said picture or other attractive feature.

3. An advertising medium embodying in combination with a picture or other attractive feature, a backing or support therefor, a flap hinged at its upper edge to said backing or support outside of the field occupied by said picture or other attractive feature, an inscription on said flap and an advertising inscription beneath said flap and normally concealed thereby, said advertising inscription being in continuation or in explanation of the first-mentioned inscription.

In testimony whereof I have hereunto set my hand in presence of two subscribing witnesses.

CHARLES H. NEAL.

Witnesses:
ARMSTEAD M. WEBB,
E. L. WOODSIDE.